(12) United States Patent  
Berg

(10) Patent No.: US 9,394,924 B2  
(45) Date of Patent: Jul. 19, 2016

(54) HYDROSTATIC SYSTEM CONFIGURED TO BE INTEGRATED IN AN EXCAVATOR

(75) Inventor: Torsten Berg, Steina (DE)

(73) Assignee: Caterpillar Inc., Peoria, IL (US)

( * ) Notice: Subject to any disclaimer, the term of this patent is extended or adjusted under 35 U.S.C. 154(b) by 430 days.

(21) Appl. No.: 13/981,352

(22) PCT Filed: Feb. 3, 2012

(86) PCT No.: PCT/EP2012/000489  
§ 371 (c)(1),  
(2), (4) Date: Jul. 24, 2013

(87) PCT Pub. No.: WO2012/107186  
PCT Pub. Date: Aug. 16, 2012

(65) Prior Publication Data  
US 2013/0298545 A1 Nov. 14, 2013

Related U.S. Application Data

(63) Continuation of application No. PCT/EP2012/000489, filed on Feb. 3, 2012.

(60) Provisional application No. 61/440,226, filed on Feb. 7, 2011.

(51) Int. Cl.  
*F15B 13/06* (2006.01)  
*F15B 11/17* (2006.01)  
*F16H 61/444* (2010.01)  
*F16H 61/4078* (2010.01)  
*E02F 9/22* (2006.01)

(52) U.S. Cl.  
CPC .............. *F15B 13/06* (2013.01); *E02F 9/2242* (2013.01); *E02F 9/2253* (2013.01); *E02F 9/2282* (2013.01); *E02F 9/2289* (2013.01); *E02F 9/2292* (2013.01); *E02F 9/2296* (2013.01); *F15B 11/17* (2013.01); *F16H 61/4078* (2013.01); *F16H 61/444* (2013.01)

(58) Field of Classification Search  
CPC ........ F15B 13/06; F15B 11/17; F16H 61/444; F16H 61/4078; E02F 9/2239; E02F 9/2242; E02F 9/2253; E02F 9/2282; E02F 9/2289; E02F 9/2292; E02F 9/2296  
USPC .................... 60/421, 422, 425, 489, 484, 486  
See application file for complete search history.

(56) References Cited

U.S. PATENT DOCUMENTS 4,561,341 A * 12/1985 Aikawa ................. E02F 9/2239  
414/687  
6,145,287 A 11/2000 Rosskopf

FOREIGN PATENT DOCUMENTS

EP 1 605 168 12/2005

OTHER PUBLICATIONS

English-language International Search Report from European Patent Office for International Application No. PCT/EP2012/000489, mailed Apr. 19, 2012.

*Primary Examiner* — Thomas E Lazo  
*Assistant Examiner* — Logan Kraft

(57) ABSTRACT

A hydrostatic system is configured to be integrated in a vehicle, e.g. an excavator. The hydrostatic system may comprise a first closed hydraulic circuit including a first hydraulic pump and a first hydraulic motor configured to operate a first component of the vehicle, and a second closed hydraulic circuit including a second hydraulic pump and a second hydraulic motor rated to operate a second component of the vehicle. Furthermore, a single six-port two-position directional valve may be provided. The single six-port two-position directional valve may be configured to switch between a first position and a second position such that in the first position the first hydraulic motor is driven by the first hydraulic pump and the second hydraulic motor is driven by the second hydraulic pump, and in the second position the first hydraulic motor is disconnected from the first hydraulic pump and the second hydraulic motor is driven by both the first and second hydraulic pumps. The present disclosure also refers to a method for operating a hydrostatic system configured to be integrated in a vehicle.

17 Claims, 3 Drawing Sheets

HYDROSTATIC SYSTEM CONFIGURED TO BE INTEGRATED IN AN EXCAVATOR

CROSS REFERENCE TO RELATED APPLICATIONS

This application is a national phase application based on PCT/EP2012/000489, filed Feb. 3, 2012, which claims the priority of Provisional Patent Application No. 61/440,226, filed Feb. 7, 2011, all of which are incorporated herein by reference.

TECHNICAL FIELD

The present disclosure refers to a hydrostatic system configured to be integrated in a vehicle, and particularly to a hydrostatic system comprising a first closed hydraulic circuit including a first hydraulic pump and a first hydraulic motor configured to operate a first component of the vehicle, and a second closed hydraulic circuit including a second hydraulic pump and a second hydraulic motor configured to operate a second component of the vehicle. Particularly, the present disclosure refers to a combined hydrostatic drive for a slewing gear and a hydrostatic travel drive of a vehicle.

Furthermore, the present disclosure generally refers to a method for operating a hydrostatic system configured to be integrated in a vehicle, particularly a wheel excavator, and particularly to a method for supplying additional hydraulic fluid at high pressure to a hydraulic motor included in a closed hydraulic circuit. A vehicle may be a self-propelled construction machine such as, e.g., a wheel excavator.

BACKGROUND

Vehicles such as, e.g., self-propelled construction machines, have often one or more hydrostatic drives for driving different components of the vehicle. The vehicles such as self-propelled constructions machines, articlualry wheel excavators, are generally exposed to extreme fluctuations with regard to the vehicle speed to be realized. Known vehicles having a hydrostatic travel drive often include a closed circuit travel system. Such closed circuit travel systems require a large travel pump to generate sufficient flow of a hydraulic fluid during high-speed travel. Vehicles as, for example, wheel excavators or other wheel construction machines as e.g. wheel dozers, wheel loaders, wheel tractor-scrapers, underground mining machines, skid steer loaders, skidders, road reclaimers, industrial loaders, wheel compactors, and feller bunchers, may be operated quite often in a low- or medium-speed travel mode, but quite rarely in a high-speed travel mode. Hence, such hydraulic drives for vehicles, which, for a major operating time, are travelled in a low or medium travel speed mode, comprise an oversized hydraulic pump for the travel system, which may result in high manufacturing costs, and which may have a negative impact on the requisite space within the vehicle, and which may negatively impact the performance of the vehicle.

Some hydraulic circuit construction designs for working machines are known from WO 2009/084853 A2, U.S. Pat. No. 7,581,392 B2, US 2008/0223027 A1, U.S. Pat. No. 7,281,373 B2, US 2010/0094515 A1, U.S. Pat. No. 3,952,510, US 2009/0248259 A, U.S. Pat. No. 3,916,767.

Another hydrostatically driven vehicle with retarder valve is disclosed in U.S. Pat. No. 6,202,783 B1. The disclosed vehicle has a hydrostatic drive and a hydraulic control apparatus. The hydrostatic drive includes a variable displacement hydraulic pump and a hydraulic motor in a closed circuit. An internal combustion engine is configured to drive the hydraulic pump and a variable displacement pump of an open circuit. A retarder valve has a valve and a pressure-limiting valve connected thereto, for throttling the volumetric output flow of the variable displacement pump.

U.S. Pat. No. 6,336,518 B1 refers to a travel assisting hydraulic circuit for hydraulic drive type working vehicles with enhanced general versatility, in which the travelling assisting circuit during travel at a high speed can be configured to be a simple circuit. For this purpose, in a hydraulic drive type working vehicle including a travelling HST circuit having a travelling pump driven by the power of an engine, and a travelling motor driven by the pressurized oil from the travelling pump. The output torque of the travelling motor is transmitted to a drive wheel via a speed reducer. The travelling assisting hydraulic circuit includes an assisting pump driven by the power of the engine, and an assisting motor for outputting the torque generated by being driven by the pressurized oil from the assisting pump to the speed reducer to add the torque to the output torque of the travelling motor.

U.S. Pat. No. 5,946,910 shows a hydraulic circuit for a hydraulically driven working vehicle which allows the vehicle to travel at an almost constant speed during high-speed travelling. The shown hydraulic circuit has a hydraulic travel pump and a working machine hydraulic pump which are driven by the power of an engine for discharging pressurized oil to an HST travel circuit and a working machine driving hydraulic circuit, respectively. Pressurized oil from the working machine hydraulic pump joins pressurized oil from the hydraulic travel pump to effect high-speed travelling, while pressurized oil from the hydraulic travel pump joins pressurized oil in the working machine hydraulic pump to generate a large digging force to effect digging. Again, all hydraulic circuits are designed as open hydraulic circuits.

U.S. Pat. No. 7,604,300 B2 discloses a dump truck or large mining truck, comprising various hydraulic circuits. Two or more hydraulic circuits may be connected to one another by a valve device which is controlled by a control device such that the plurality of hydraulic circuits cooperate in an unloading mode and actuate a dump body together and, on the other hand, the hydraulic circuits work separately in the travel mode so that the second hydraulic circuit and/or any further hydraulic circuit is separated from the dump body and its actuator device.

A hydrostatic circuit for harvesting machines is disclosed in U.S. Pat. No. 6,145,287 A. The hydrostatic circuit disclosed therein comprises a multiple pump apparatus including first and second variable displacement closed circuit pumps. The multiple pump apparatus pressurizes fluid to be subsequently supplied to drive load devices. The first and second pumps each have fluid communication lines connected to load devices through two flow directional valves. Each of the pumps has a swash plate for varying its displacement. The swash plates are of the over-center type, enabling each pump to supply pressurized fluid in either direction, thus providing both forward and reverse function to the load devices. The first pump has its fluid communication lines connected to fluid communication lines between first and second 4/2 directional valves (four-port two-position directional valves). The opposite side of the first directional valve has fluid communication lines connected to a load device which drives a harvesting mechanism, in this case a rotor motor. The opposite side of the second flow directional valve has fluid communication lines connected to the circuit for driving the load device for the propel function, in this case the propel motor(s). In this way, the combined flow from the two pumps enables the vehicle to attain high-speed operation for roading without the need for a single large fluid displacement propel pump to support this performance requirement. Nevertheless, the number of flow directional valves may result in a higher susceptibility to damage. Moreover, the necessary number of flow directional valves increase manufacturing costs.

The present disclosure is directed, at least in part, to improving or overcoming one or more aspects of prior systems.

SUMMARY OF THE DISCLOSURE

In one aspect, the present disclosure is directed to a hydrostatic system configured to be integrated in a vehicle. Such a hydrostatic system may comprise a first closed hydraulic circuit including a first hydraulic pump and a first hydraulic motor configured to operate a first component of the vehicle. A second closed hydraulic circuit may include a second hydraulic pump and a second hydraulic motor configured to operate a second component of the vehicle. Additionally, a single six-port two-position directional valve may be provided. This single directional valve may be configured to switch between a first position and a second position such that in the first position the first hydraulic motor is solely driven by the first hydraulic pump, and the second hydraulic motor is solely driven by the second hydraulic pump. And in the second position, the first hydraulic motor is disconnected from the first hydraulic pump and the second hydraulic motor is driven by both the first and second hydraulic pumps.

In a further aspect the present disclosure is directed to a method for operating a hydrostatic system configured to be integrated in a vehicle. The disclosed method may comprise the step of permanently connecting a second hydraulic motor to a second hydraulic pump. A single two-position six-port directional valve may be provided. The method may further comprise positioning the single directional valve in the first position such that a first hydraulic motor is connected to a first hydraulic pump. The single directional valve may be switched from the first position to the second position such that the first hydraulic motor is disconnected from the first hydraulic pump and the first hydraulic pump is connected to the second hydraulic motor.

In another aspect the present disclosure is directed to a combined hydrostatic slewing gear drive and a hydrostatic travel drive, both configured to be integrated in a vehicle such as, e.g., an excavator. The hydrostatic slewing gear drive may comprise a first closed hydraulic circuit configured to slew an upper carriage of a vehicle, particularly a wheel excavator. The hydrostatic travel drive may comprise a second closed hydraulic circuit configured to move or travel the vehicle. Additionally, a single six-port two-position directional valve may be provided. This single directional valve may be configured to switch between a first position and a second position such that in the first position a first hydraulic motor of the hydrostatic slewing gear drive is solely driven by a first hydraulic pump of the hydrostatic slewing gear drive, and a second hydraulic motor of the hydrostatic travel drive is solely driven by a second hydraulic pump of the hydrostatic travel drive. And in the second position, the first hydraulic motor of the hydrostatic slewing gear drive is disconnected from the first hydraulic pump of the hydrostatic travel drive and the second hydraulic motor of the hydrostatic travel drive is driven by both the first and second hydraulic pumps.

Generally, the present disclosure may provide a more cost efficient design for a hydrostatic system. Moreover, the new concept for combining two closed hydraulic circuits may allow to reduce the size of the dedicated hydraulic pump of the hydrostatic travel drive of the vehicle, e.g. an excavator.

With respect to controllability of one of the methods disclosed herein it may be appropriate to combine the two closed hydraulic circuits only if the vehicle may operate in a condition where the first hydraulic motor is normally not used, particularly when, e.g., travelling on a public road; during this operation mode the one hydraulic consumer of the first closed hydraulic circuit has to be disabled anyway, at least when the travel speed of the vehicle may exceed a defined travel speed threshold.

Other features and aspects of this disclosure will be apparent from the following description and the accompanying drawings.

DETAILED DESCRIPTION

Figure 1:
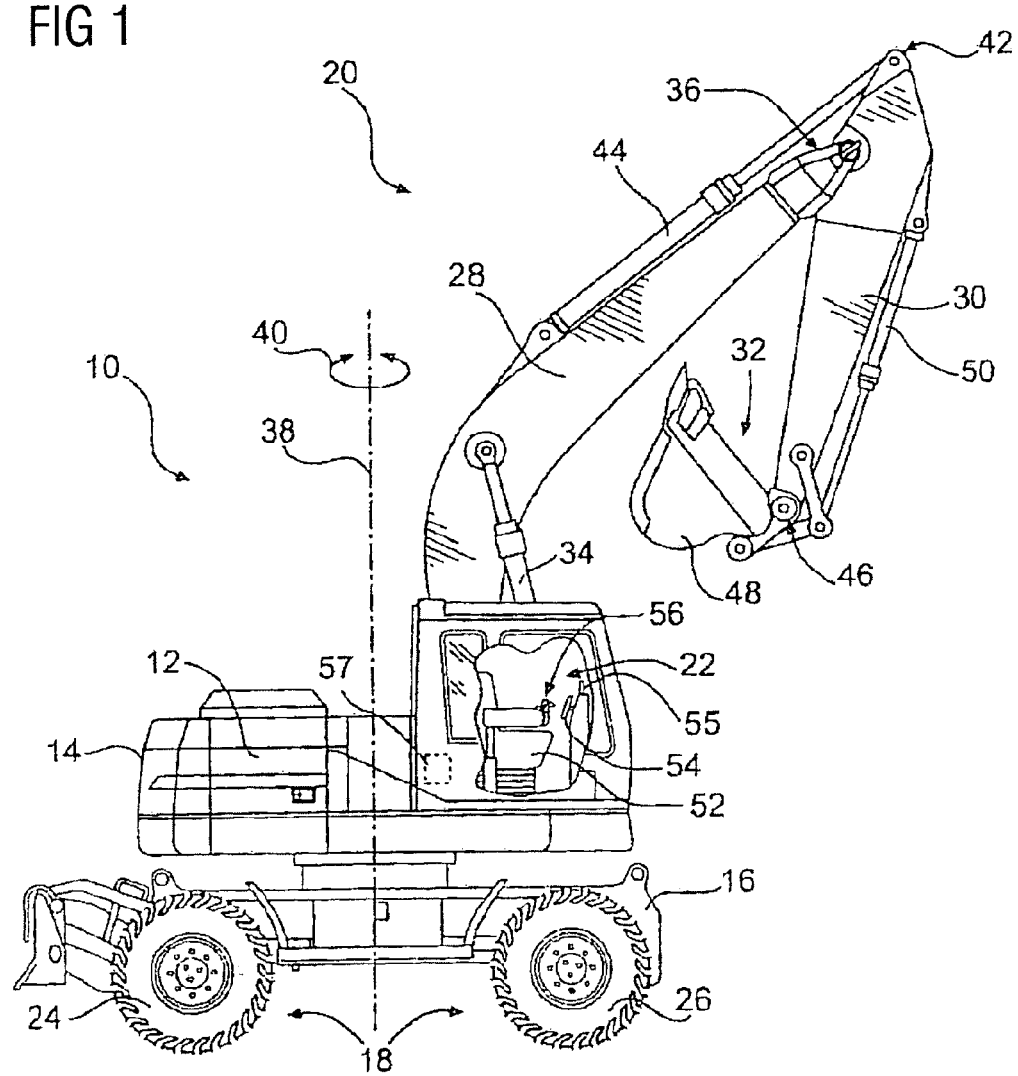
FIG. 1 is a diagrammatic illustration of a wheel excavator configured to travel by means of a hydrostatic drive according to an exemplary disclosed embodiment.

Reference will now be made in detail to the drawings. Wherever possible, the same reference numeral will be used throughout the drawings to refer to the same or like parts.

FIG. 1 shows a vehicle 10 as, e.g., a wheel excavator. Vehicle 10 may include a power source 12, and an upper carriage 14, which may be operably attached to an under carriage 16. Vehicle 10 may also include a traction system 18, e.g. a plurality of wheels 24, 26, which may be operably attached to under carriage 16. In addition, vehicle 10 may include a work implement 20 and an operator station 22 from which work implement 20 may be controlled.

Vehicle 10, although shown in FIG. 1 as a wheel excavator, may be any type of work machine with operator-controlled steering and travelling. For example, vehicle 10 may include wheel loaders, motor graders, backhoe loaders, skid steers, track-type tractors, tracked excavators, and any other type of work machine with operator-controlled steering and travelling.

Upper carriage 14 may be fixedly mounted on under carriage 16. Alternatively, upper carriage 14 may be rotatably mounted on under carriage 16. As yet another alternative, upper carriage 14 may be mounted to under carriage 16 in a slidable fashion or any other configuration. In addition, vehicle 10 may include a cab riser function, by which upper carriage 14 may be raised and lowered relative to under carriage 16. Alternatively or additionally, the cab riser function may cause operator station 22 to be raised and lowered relative to upper carriage 14. The cab raiser function may be hydraulically actuated.

Traction system 18 may include at least one traction device, such as, for example, a first set of wheels 24 and a second set of wheels 26, as shown in FIG. 1. At least one set of wheels may be steerable. Vehicle 10 may be configured with two-wheel or four-wheel steering. Further, a steering configuration may be selectable between two-wheel and four-wheel steering, or the operator may switch which set of wheels is steerable.

While traction system 18 has been shown to include wheels, the present disclosure may also apply to work machines or vehicles with one or more endless tracks and/or belts, or any other type of traction device. In addition, the present disclosure may apply to steering systems that vary a steering angle of one or more traction devices, as well as skid steer, and differential steering systems. Further, these systems may each apply to work machines with a variety of types of traction devices. For example, while track type work machines are commonly configured with skid steer or differential steering systems, they may alternatively, or additionally, be configured with steering systems that vary a steering angle of one or more tracks. Similarly, wheeled work machines or vehicles may steer with a variable steering angle system, skid steer, and/or differential steering systems.

Work implement 20 may be any type of work implement and may include any type of work tool, such as, for example, a bucket, blade, grapple, jackhammer, shears, etc.

As shown in FIG. 1, work implement 20 may include a boom 28, a stick 30, and a work tool 32 attached to the end of stick 30. Boom 28 may be pivotably attached to upper carriage 14. A boom actuator 34 may be attached to upper carriage 14 and boom 28, such that a distal end 36 of boom 28 may be raised and lowered by actuation of boom actuator 34.

Distal end 36 of boom 28 may also be moved side-to-side. In the exemplary embodiment shown, boom 28 may be moved side-to-side by rotation of upper carriage 14 relative to under carriage 16 about an axis 38 in a direction indicated by an arrow 40. For purposes of this disclosure, the side-to-side movement of work implement 20 via rotational movement of upper carriage 14 relative to under carriage 16 shall be referred to as "swing". Vehicle 10 may also include an offset boom function by which boom 28 may be pivoted side-to-side relative to upper carriage 14.

Stick 30 may be pivotably attached to boom 28 at a proximal end 42. A stick actuator 44 may be attached to boom 28 and stick 30 such that actuation of stick actuator 44 may cause stick 30 to extend and retract with respect to boom 28 in a manner of a jackknife. That is, a distal end 46 of stick 30 may be extended further away from upper carriage 14, and retracted closer to upper carriage 14 by actuating stick actuator 44.

Work tool 32 may be attached to distal end 46 of stick 30. While work tool 32 has been illustrated in FIG. 1 as a bucket 48, work tool 32 may be any type of work tool. Work tool 32 may be pivotably attached to distal end 46 of stick 30. A work tool pivot actuator 50 may be attached to stick 30 and work tool 32 such that actuation of work tool pivot actuator 50 may cause work tool 32 to pivot relative to stick 30.

Operator station 22 may be a cab as illustrated in FIG. 1, and may be attached to or integral with upper carriage 14. Operator station 22 may include an operator seat 52, a first steering device, such as, for example, a steering wheel 54, a display 55, and at least one hand-operated work implement control device 56, e.g. a joystick. Steering wheel 54 may be operatively coupled to a first set of wheels 24 and/or second set of wheels 26 so as to control their directional movement. Steering wheel 54 may tilt and/or telescope relative to operator seat 52 in order to facilitate ingress and egress, or to provide a more open cab while operating other control devices. For example, steering wheel 54 may be tilted and/or telescoped out of the way while a secondary steering control system is active. Vehicle 10 may include two work implement control devices, one on each side of operator seat 52.

Work implement control device 56 may control multiple functions of vehicle 10, as, for example, operation of work implement 20 (including movements of boom 28, stick 30, and work tool 32), swing, propulsion of vehicle 10, steering, the cab raiser function, the offset boom function, etc.

Boom actuator 34, stick actuator 44, and work tool pivot actuator 50 may be any kind of actuators, such as, for example, hydraulic cylinders as shown in FIG. 1. Each hydraulic cylinder may be associated with its own hydraulic circuit in order to be independently controlled. Some work tools, such as bucket 48, may have a single actuator, and thus may be controlled by a single hydraulic circuit. Other types of work tools, such as grapple may include more than one actuator, and thus may be controlled by more than one hydraulic circuit. For example, grapple may be controlled by two or more hydraulic circuits. One circuit may control work tool pivot actuator 50, which may pivot the grapple in the same manner as it does bucket 48. Additionally, a second circuit may control an auxiliary function, such as rotation of the grapple.

One or more of the boom actuator 34, stick actuator 44, work tool pivot actuator 50 and all the others, like hydraulic cylinders, may be driven by one or more hydraulic circuits (not shown).

Figure 2:
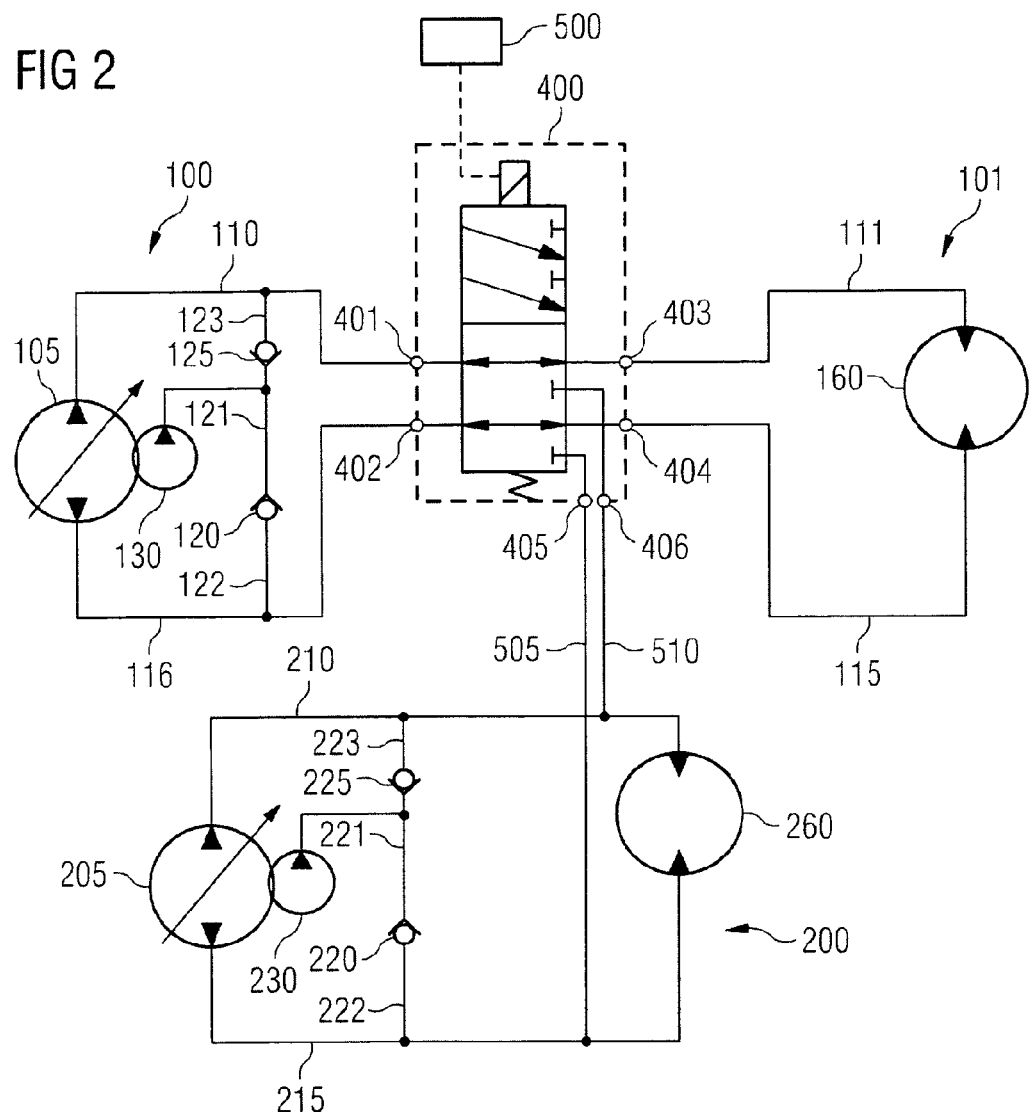
FIG. 2 is a diagrammatic illustration of a hydrostatic system for a vehicle according to an exemplary disclosed embodiment, the single directional valve being in a first position.
Figure 3:
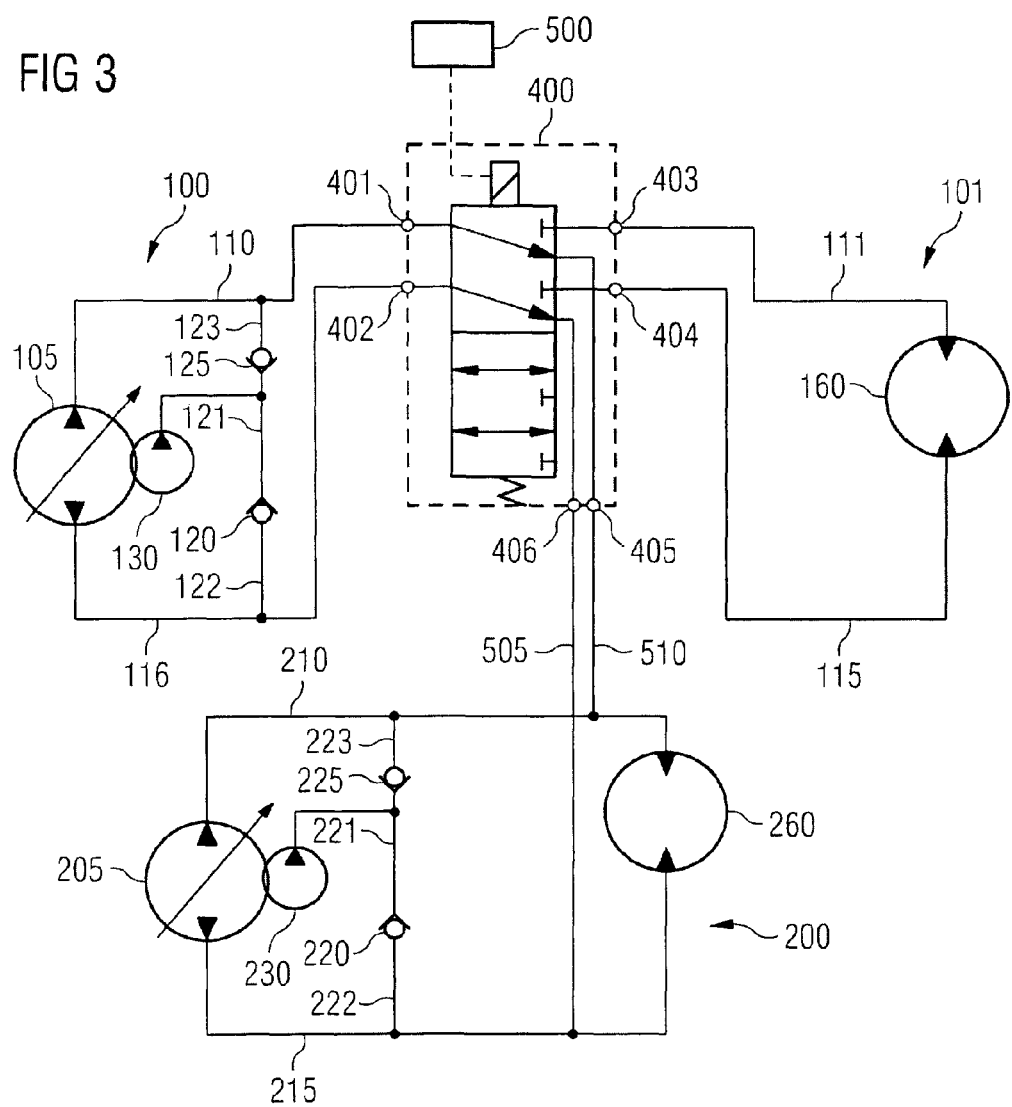
FIG. 3 is another diagrammatic illustration of the hydrostatic system for a vehicle of FIG. 2, the single directional valve being in a second position.

The wheel excavator 10 as shown in FIG. 1 may be equipped with a hydrostatic drive system as shown in FIGS. 2 and 3. This hydrostatic drive system may comprise a first closed hydraulic circuit 100, 101 and a second closed hydraulic circuit 200.

First closed hydraulic circuit 100, 101 may include a first hydraulic pump 105 and a first hydraulic motor 160. First hydraulic motor 160 may be configured to operate a first component 14 of vehicle 10. The first component may include a slewing gear drive for slewing the upper carriage 14 of excavator 10. The first hydraulic circuit may consist of a first hydraulic circuit part 100 and a second hydraulic circuit part 101. First hydraulic circuit part 100 may comprise first hydraulic pump 105, a first "A" hydraulic line part 110, and a second "B" hydraulic line part 116. Second hydraulic circuit part 101 may comprise first hydraulic motor 160, a second "A" hydraulic line part 111 and a first "B" hydraulic line part 115. First "A" hydraulic line part 110 and second "B" hydraulic line part 116 may be connected via hydraulic line parts 121, 122, 123. A first check valve 120 may be interposed between hydraulic line parts 122, 122. A second check valve 125 may be interposed between hydraulic line parts 121, 123. A first feed pump 130 may be connected to hydraulic line part 121.

Second closed hydraulic circuit 200 may include a second hydraulic pump 205 and a second hydraulic motor 260. Second hydraulic motor 260 may be configured to operate a second component 16 of vehicle 10. Second component 16 may be under carriage 16 of excavator 10. In other words, second closed hydraulic circuit 200 may be configured to provide a travel drive system for rotating one or more wheels 24, 26 of vehicle 10, e.g. excavator 10.

A second "A" hydraulic line 210 and a second "B" hydraulic line 215 may be connected via hydraulic line parts 221, 222, 223. A first check valve 220 may be interposed between hydraulic line parts 220, 222. A second check valve 225 may be interposed between hydraulic line parts 221, 223. A second feed pump 230 may be connected to hydraulic line part 121.

The hydraulic system of FIG. 2 may also comprise a single six-port two-position directional valve 400. Valve 400 may be configured to switch between a first position and a second position. The valve 400 may include six ports 401-406. The valve unit 400 may be configured as follows.

In the first position ports 401 and 403 are connected. The same applies to ports 402 and 404. Ports 405 and 406 are disconnected. First "A" hydraulic line part 110 may be connected to port 401 of valve 400. Second "B" hydraulic line part 116 may be connected to port 402 of valve 400. As in the first position of valve 400 ports 405, 406 are not connected to another port, no hydraulic fluid can be exchanged between first hydraulic circuit 100, 101 and second hydraulic circuit 200 via connection lines 505, 510.

In the second position, as shown in FIG. 3, ports 401 and 406 are connected. The same applies to ports 402 and 405. Ports 403 and 404 are disconnected. Hence, second "A" hydraulic line part 111 and first "B" hydraulic line part 115 are disconnected from first "A" hydraulic line part 110 and second "B" hydraulic line part 116, respectively. Accordingly, in the second position, ports 403 and 404 are not connected to another port, and first part 100 of first hydraulic circuit 100, 101 is connected to second hydraulic circuit 200 such that hydraulic fluid can be exchanged between first part 100 of first hydraulic circuit 100, 101 and second hydraulic circuit 200 via connection lines 505, 510.

In the first position of valve 400 first hydraulic motor 160 may be solely driven by first hydraulic pump 105. Furthermore, in the first position, second hydraulic motor 260 may be solely driven by second hydraulic pump 205. Accordingly, the single valve unit 400 may be configured and designed such that in the first position first closed hydraulic circuit 100, 101 and second closed hydraulic circuit 200 may be separated from each other. In the second position, second "A" hydraulic line part 111 and first "B" hydraulic line part 115 may be disconnected from first "A" hydraulic line part 110 and second "B" hydraulic line part 116, respectively. That means ports 403 and 404 are not connected to any other ports within the valve in the second position. Connection lines 505 and 510 are connected to ports 402, 401 via valve 400 taking the second position, and, consequently, hydraulic fluid may be exchanged between first part 100 of first hydraulic circuit 100, 101 and second hydraulic circuit 200 via connection lines 505, 510.

The single valve unit 400 may be configured such that in the second position first hydraulic motor 160 is disconnected from first hydraulic pump 105. Moreover, second hydraulic motor 260 is driven by both the first and second hydraulic pumps 105, 205 when the single valve unit 400 takes the second position. Accordingly, in case the single valve unit 400 takes the second position, as shown in FIG. 3, first hydraulic motor 160 may be separated from first hydraulic pump 105 and first hydraulic pump 105 may be connected to second closed hydraulic circuit 200. As a result, the second hydraulic motor 260 may be supplied with pressurized hydraulic fluid via first hydraulic pump 105 and second hydraulic pump 205.

It has to be noted that the denotation "A" or "B" hydraulic line part may refer to a hydraulic line connection between a hydraulic pump, e.g. hydraulic pump 105, and a hydraulic motor, e.g. hydraulic motor 260. In particular, the "A" hydraulic line parts 110, 111 may form a first hydraulic line connection between hydraulic pump 105 and hydraulic motor 260 connecting first connections of hydraulic pump 105 and hydraulic motor 260, the "B" hydraulic line parts 115, 116 may form a second hydraulic line connection between hydraulic pump 105 and hydraulic motor 260 connecting the second connections of hydraulic pump 105 and hydraulic motor 260. Consequently, the "A" hydraulic line parts and the "B" hydraulic line parts all together may form a closed hydraulic circuit connecting a hydraulic pump as, e.g., hydraulic pump 105, and a hydraulic motor as, e.g., hydraulic motor 260.

INDUSTRIAL APPLICABILITY

A vehicle such as, e.g. a wheel excavator 10 as shown in FIG. 1, including a travel system as schematically shown in FIG. 2 may be operated as follows. An operator may adjust the desired travel speed via a control device as, for example, a pedal in the area of the operator seat 52 within operator station 22 as shown in FIG. 1. A corresponding signal may be transmitted to a control unit 500.

Based on FIGS. 1 to 3 an exemplary embodiment of vehicle 10, e.g. excavator 10 of FIG. 1, is explained below. Via control element 500 the single valve 400 may be controlled. In the present embodiments as shown in FIGS. 2 and 3 the single valve 400 may take the first position as shown in FIG. 2, i.e. valve 400 may be not energized. Accordingly, the first part 100 of first hydraulic circuit 100, 101 and the second part 101 of second hydraulic circuit 111 may be connected. Consequently, when first hydraulic pump 105 runs, pressurized hydraulic fluid may be supplied via first "A" hydraulic line part 110 and second "A" hydraulic line part 111 to hydraulic motor 160. Consequently, hydraulic motor 160 rotates and may drive a slewing gear drive mechanism (not shown) for rotating upper carriage 14 of excavator 10. Fluid leaving hydraulic motor 160 may return via first "B" hydraulic line part 115 and second "B" hydraulic line part 116 to hydraulic pump 105. Possible leakage of hydraulic fluid, as it is common in closed hydraulic circuits, may be replaced via a feed pump 130.

As explained above, in the first position ports 405 and 406 are closed, i.e. disconnected from first hydraulic circuit 100. Accordingly, when second hydraulic pump 205 runs, pressurized hydraulic fluid is supplied via "A" hydraulic line 210 to second hydraulic motor 260. As a result second hydraulic motor 260 may rotate and may rotate one or more wheels 24, 26 of undercarriage 16 of excavator 10. Consequently, the faster the second hydraulic pump 205 rotates the faster the second hydraulic motor 260 rotates and the faster vehicle 10, e.g. excavator 10, moves forward, or backward if the first and second hydraulic pumps 105, 205 rotate in the reverse direction. As the second closed hydraulic circuit may lose hydraulic fluid due to leakage as it is common in the prior art, second feed pump 230 may replace the losses. The travel speed may be regulated by the displacement of the travel pump 205 and/or of the first hydraulic pump 105 and/or by adjusting variable displacement motor 260.

In some cases, particularly if vehicle 1 shall drive faster than a predefined travel speed threshold, for example 5 to 15 km/h, the size of second hydraulic pump 205 does not satisfy the requirements for rotating second hydraulic motor 260 such that vehicle 10 moves at the desired travel speed. Furthermore, at travel speeds higher than the predefined threshold, the slewing gear drive for upper carriage 14 of excavator 10 shall not be activated or operated. Consequently, the capacity and performance of first hydraulic pump 105 may be used for supplying additional hydraulic fluid into second closed hydraulic circuit 200. Hence, when an operator activate a pedal or speed control element (not shown) such that control element 500 determines that the travel speed threshold will be exceeded, the control unit 500 commands the valve 400 to switch from the first position to the second position as shown in FIG. 3. Consequently, hydraulic fluid supplied by first hydraulic pump 105 may flow via first "A" hydraulic line part 110 and connection line 510 into second closed circuit 200. Hydraulic flows in "A" hydraulic line 210 and connection line 510 combine and enter second hydraulic motor 260. As a result second hydraulic motor 260 may rotate even faster than it is possible by second hydraulic pump 205 alone, even if second hydraulic pump 205 runs at its highest power. Consequently, excavator 10 may move faster than the speed threshold.

Hydraulic fluid leaving hydraulic motor 260 may return via "B" hydraulic line 215 and connection line 505 to first and second hydraulic pumps 105, 205.

In another embodiment of the present disclosure the switching from the first to the second position of valve 400 may be conducted automatically if the control unit (not shown) determines that the desired speed selected by an operator for moving vehicle 10 is higher than the predefined speed threshold.

The travel speed of wheel excavator 10 may be changed even if the travel speed is above the travel speed threshold by adjusting the volumetric output of the first hydraulic pump 105 and/or the second hydraulic pump 205 and/or second motor 260.

As normally during high-speed travel of wheel excavator 10 slewing gear drive and other hydraulic consumers like actuators 34, 44, 50 do not have to be operated, usage of first hydraulic pump 105 for assisting performance of second hydraulic pump 205 shall be possible.

A benefit of the present disclosure may be that without increasing the size of the second hydraulic pump of the second closed circuit higher travel speeds may be reached. Accordingly, small sized hydraulic travel pumps may be used for vehicles constructed to travel at high travel speeds because of using another hydraulic pump of another closed circuit generally provided. Due to a single switch valve used, costs may be lowered.

It has to be noted that in one or more of the closed hydraulic circuits 100, 101 and 200 the hydraulic fluid may be pumped in both directions, dependent on the desired rotating direction of the hydraulic motors 160, 260.

The expressions "closed circuit" or "closed hydraulic circuit" as may be used herein are synonyms for the identical subject-matter.

The technical term "closed circuit" may refer to a hydraulic circuit in which the hydraulic fluid, which was supplied to a hydraulic consumer as, e.g., a hydraulic motor or an actuator, by means of a hydraulic pump returns to the hydraulic pump. Only a minor part of the hydraulic fluid circulating in the closed circuit may be guided to a reservoir for the reason of flushing the system or as an external leakage.

The expression "feed pump" may be replaced by the expression "boost pump".

A vehicle according to the present disclosure may be configured as, e.g. a wheel excavator, a wheel dozer, a wheel loader, a wheel tractor-scraper, a wheeled underground mining machine, a skid steer loader, a skidder, a road reclaimer, a wheeled industrial loader, a wheel compactor, or a feller buncher.

The hydrostatic system according to the present disclosure may comprise one or more hydraulic pumps having a swash plate for varying its displacement. The swash plates may be of the over-center type, enabling each pump to supply pressurized fluid in either direction, thus providing both forward and reverse function to the load devices.

Although the preferred embodiments of this invention have been described herein, improvements and modifications may be incorporated without departing from the scope of the following claims.

The invention claimed is:

1. A hydrostatic system configured to be integrated in a vehicle, comprising:
   a first closed hydraulic circuit including a first hydraulic pump and a first hydraulic motor configured to operate a first component of the vehicle;
   a second closed hydraulic circuit including a second hydraulic pump and a second hydraulic motor configured to operate a second component of the vehicle;
   a single six-port two-position directional valve configured to switch between a first position and a second position such that in the first position the first hydraulic motor is solely driven by the first hydraulic pump and the second hydraulic motor is solely driven by the second hydraulic pump, and in the second position the first hydraulic motor is disconnected from the first hydraulic pump and the second hydraulic motor is driven by both the first and second hydraulic pumps; and
   a control unit configured to determine a desired travel speed, compare the determined desired travel speed with a defined travel speed threshold, and output a command to the single six-port two-position directional valve to switch from the first position to the second position.

2. The hydrostatic system of claim 1, wherein
   the first closed hydraulic circuit further includes a first hydraulic line including first and second hydraulic line parts and a second hydraulic line including third and fourth hydraulic line parts;
   the second closed hydraulic circuit further includes a third hydraulic line, and a fourth hydraulic line;
   the single six-port two-position directional valve includes first to sixth ports, the first port being connected to the first hydraulic line part, the second port being connected to the fourth hydraulic line part, the third port being connected to the second hydraulic line part, the fourth port being connected to the third hydraulic line part, the fifth port being connected to the third hydraulic line via a first hydraulic fluid connection line, and the sixth port being connected to the fourth hydraulic line via a second hydraulic fluid connection line.

3. The hydrostatic system of claim 1, wherein at least one of the first hydraulic pump and the second hydraulic pump is a variable displacement pump.

4. The hydrostatic system of claim 3, wherein each of the hydraulic pumps is configured to supply pressurized fluid in either direction, thus providing both forward and reverse function to the first and second components.

5. The hydrostatic system of claim 1, wherein the hydrostatic system is configured to be integrated in an excavator including a travelling under carriage and an upper carriage mounted for slewing on the under carriage, the first closed hydraulic circuit being configured to slew the upper carriage of the excavator and the second closed hydraulic circuit being configured to travel the excavator.

6. A method for operating a hydrostatic system configured to be integrated in a vehicle, the method comprising:
   connecting a second hydraulic motor to a second hydraulic pump;
   providing a single six-port two-position directional valve configured to take a first position and a second position;
   positioning the single six-port two-position directional valve in the first position such that a first hydraulic motor is connected to a first hydraulic pump;
   determining a desired travel speed for the vehicle;
   comparing the determined desired travel speed with a defined travel speed threshold; and
   outputting a command to switch the single six-port two-position directional valve from the first position to the second position such that the first hydraulic motor is disconnected from the first hydraulic pump and the first hydraulic pump is connected to the second hydraulic motor.

7. The method of claim 6, further including:
positioning the single six-port two-position directional valve in the first position such that the first hydraulic motor is connected to the first hydraulic pump,
rotating an upper carriage of an excavator by the first hydraulic motor and
moving an under carriage of the excavator by the second hydraulic motor.

8. The method of claim 6, further including:
switching the single six-port two-position directional valve from the first position to the second position such that the first hydraulic motor is disconnected from the first hydraulic pump and the first hydraulic pump is connected to the second hydraulic motor,
discontinuing rotating of an upper carriage of an excavator by the first hydraulic motor and
moving an under carriage of the excavator by both the first and second hydraulic pumps.

9. The method of claim 8, further comprising:
determining a desired travel speed and, when the desired travel speed exceeds a defined travel speed threshold, switching the single six-port two position directional valve from the first position to the second position.

10. A hydrostatic system configured to be integrated in a vehicle, comprising:
a first closed hydraulic circuit including a first hydraulic pump and a first hydraulic motor configured to operate a first component of the vehicle;
a second closed hydraulic circuit including a second hydraulic pump and a second hydraulic motor configured to operate a second component of the vehicle;
a single six-port two-position directional valve configured to switch between a first position and a second position such that in the first position the first hydraulic motor is driven by the first hydraulic pump and the second hydraulic motor is driven by the second hydraulic pump, and in the second position the first hydraulic motor is disconnected from the first hydraulic pump and the second hydraulic motor is driven by both the first and second hydraulic pumps; and
a control unit configured to determine a desired travel speed, compare the determined desired travel speed with a defined travel speed threshold, and output a command to the single six-port two-position directional valve to switch from the first position to the second position.

11. The hydrostatic system of claim 10, wherein
the first closed hydraulic circuit further includes a first hydraulic line including first and second hydraulic line parts and a second hydraulic line including third and fourth hydraulic line parts;
the second closed hydraulic circuit further includes a third hydraulic line, and a fourth hydraulic line; and
the single six-port two-position directional valve includes first to sixth ports, the first port being connected to the first hydraulic line part, the second port being connected to the fourth hydraulic line part, the third port being connected to the second hydraulic line part, the fourth port being connected to the third hydraulic line part, the fifth port being connected to the third hydraulic line via a first hydraulic fluid connection line, and the sixth port being connected to the fourth hydraulic line via a second hydraulic fluid connection line.

12. The hydrostatic system of claim 11, wherein at least one of the first hydraulic pump and the second hydraulic pump is a variable displacement pump.

13. The hydrostatic system of claim 11, wherein each of the hydraulic pumps is configured to supply pressurized fluid in either direction, thus providing both forward and reverse function to the first and second components.

14. The hydrostatic system of claim 11, wherein the hydrostatic system is configured to be integrated in an excavator including a travelling under carriage and an upper carriage mounted for slewing on the under carriage, the first closed hydraulic circuit being configured to slew the upper carriage of the excavator and the second closed hydraulic circuit being configured to travel the excavator.

15. The hydrostatic system of claim 10, wherein at least one of the first hydraulic pump and the second hydraulic pump is a variable displacement pump.

16. The hydrostatic system of claim 10, wherein each of the hydraulic pumps is configured to supply pressurized fluid in either direction, thus providing both forward and reverse function to the first and second components.

17. The hydrostatic system of claim 10, wherein the hydrostatic system is configured to be integrated in an excavator including a travelling under carriage and an upper carriage mounted for slewing on the under carriage, the first closed hydraulic circuit being configured to slew the upper carriage of the excavator and the second closed hydraulic circuit being configured to travel the excavator.

* * * * *